US008636388B2

(12) United States Patent
Röer (10) Patent No.: US 8,636,388 B2
(45) Date of Patent: Jan. 28, 2014

(54) NACELLE OF A WIND TURBINE COMPRISING AVIATION OBSTRUCTION LIGHTS

(75) Inventor: Jochen Röer, Ganderkesee (DE)

(73) Assignee: Aloys Wobben, Aurich (DE)

(*) Notice: Subject to any disclaimer, the term of this patent is extended or adjusted under 35 U.S.C. 154(b) by 184 days.

(21) Appl. No.: 13/055,451

(22) PCT Filed: Jul. 16, 2009

(86) PCT No.: PCT/EP2009/059186
§ 371 (c)(1),
(2), (4) Date: Apr. 25, 2011

(87) PCT Pub. No.: WO2010/010043
PCT Pub. Date: Jan. 28, 2010

(65) Prior Publication Data
US 2011/0194283 A1    Aug. 11, 2011

(30) Foreign Application Priority Data
Jul. 24, 2008  (DE) .......................... 10 2008 034 747

(51) Int. Cl.
*F21S 8/00*  (2006.01)
(52) U.S. Cl.
USPC .................. 362/431; 340/983; 416/132 B
(58) Field of Classification Search
USPC .................... 340/983; 416/132 B, 5; 362/431
See application file for complete search history.

(56) References Cited

U.S. PATENT DOCUMENTS

| 4,620,190 | A | 10/1986 | Tigwell et al. |
| 6,013,985 | A | 1/2000 | Green et al. |
| 6,867,710 | B2 * | 3/2005 | Wobben ......................... 340/963 |
| 7,589,641 | B2 | 9/2009 | Wobben ..................... 340/815.4 |
| 7,876,260 | B2 * | 1/2011 | Laufer ............................ 342/61 |
| 2002/0102161 | A1 * | 8/2002 | Nordhoff ........................... 416/5 |
| 2003/0043585 | A1 | 3/2003 | Rohlfing et al. ............... 362/302 |
| 2003/0156047 | A1 * | 8/2003 | Wobben ......................... 340/983 |
| 2005/0079052 | A1 * | 4/2005 | Wobben ........................... 416/5 |
| 2005/0249595 | A1 * | 11/2005 | Wobben .................... 416/132 B |
| 2010/0194603 | A1 * | 8/2010 | Wobben ......................... 340/983 |

FOREIGN PATENT DOCUMENTS

| CL | 1282-2001 | 6/2001 |
| DE | 2257457 | 7/1973 |

(Continued)

OTHER PUBLICATIONS

English Translation of JP2004-293359 published Oct. 21, 2004.*
Montgomerie, "Obstacle Markings on Wind Turbines for Safe Aviation and Marine Navigation," Swedish Defense Research Agency, FOI Memorandum 979, Aug. 2004, pp. 1-10.

(Continued)

*Primary Examiner* — Mary Ellen Bowman
(74) *Attorney, Agent, or Firm* — Seed IP Law Group PLLC (57) ABSTRACT

A pod of a wind power installation is provided having an aviation obstruction lighting arrangement. The aviation obstruction lighting arrangement includes a central light device which in the erected condition of the wind power installation is arranged on the pod on the top thereof, and two lateral light devices which in the erected condition of the wind power installation are arranged at mutually opposite sides of the pod.

17 Claims, 4 Drawing Sheets

(56) References Cited

FOREIGN PATENT DOCUMENTS

| | | |
|---|---|---|
| DE | 10125270 | 12/2002 |
| DE | 102 31 299 A1 | 1/2004 |
| DE | 20312839 | 1/2004 |
| DE | 20317373 | 2/2004 |
| DE | 20 2004 006 595 U1 | 8/2004 |
| GB | 1383653 | 2/1975 |
| GB | 2315123 A | 1/1998 |
| JP | 11-159440 A | 6/1999 |
| JP | 11-182409 A | 7/1999 |
| JP | 2002-279802 A | 9/2002 |
| WO | 97/29320 A1 | 8/1997 |
| WO | 2006/077084 | 7/2006 |

OTHER PUBLICATIONS

Advisory Circular/AC70/7460-1K "Obstruction Marking and Lighting," US Department of Transportation/Federal Aviation Administration, Mar. 2000, 52 pages.

Advisory Circular/AC70/7460-1G "Obstruction Marking and Lighting," US Department of Transportation/Federal Aviation Administration, Oct. 22, 1985, 67 pages.

Bro, C. et al., "National testing station for large wind turbines Evaluation of the Effect on the Environment (EEE)", The Environmental and Energy Ministry Department for national planning, Jan. 2000, pp. 2-12.

* cited by examiner

NACELLE OF A WIND TURBINE COMPRISING AVIATION OBSTRUCTION LIGHTS

BACKGROUND

1. Technical Field

The present disclosure concerns a nacelle of a wind turbine comprising aviation obstruction lights. The disclosure further concerns a wind turbine and it concerns aviation obstruction lights.

2. Description of the Related Art

A typical wind power installation has a pylon which is secured on the ground or in the sea on which a rotatably mounted nacelle or pod is arranged. The pod carries a rotor having at least one rotor blade and usually three rotor blades to convert wind energy into electrical energy, together with a generator. Conventional wind power installations nowadays have a rotor with a substantially horizontal rotor axis. The pod which accommodates the generator and further elements for the operation of a wind power installation is mounted on the pylon rotatably about a vertical axis to turn the rotor with its rotor axis into the wind (adjustment of the azimuth angle). Modern wind power installations have great pylon heights which in some cases extend far above 100 m. Depending on the respective height and regional or territorial regulations such wind power installations must be identified in clearly visible fashion for air traffic, with a so-called aviation obstruction lighting arrangement. Such an aviation obstruction lighting arrangement usually has at least one light device which is visible through an angle of 360° measured on a horizontal plane and thus lights up over an angle of 360°. In other words, at least one panoramic light is to be provided.

Such an aviation obstruction lighting arrangement can be arranged on the pod. That involves the problem that, depending on the viewing direction, that is to say depending on the respective position of the viewer, such as for example the pilot of an aircraft, and depending on the respective azimuth position of the pod and depending on the respective instantaneous position of the rotor, a rotor blade conceals the aviation obstruction lighting arrangement. At that moment an individual aviation obstruction lighting arrangement is not discernible to the described viewer. That is problematical then because it must always be possible to see one light from any direction.

Figure 7:
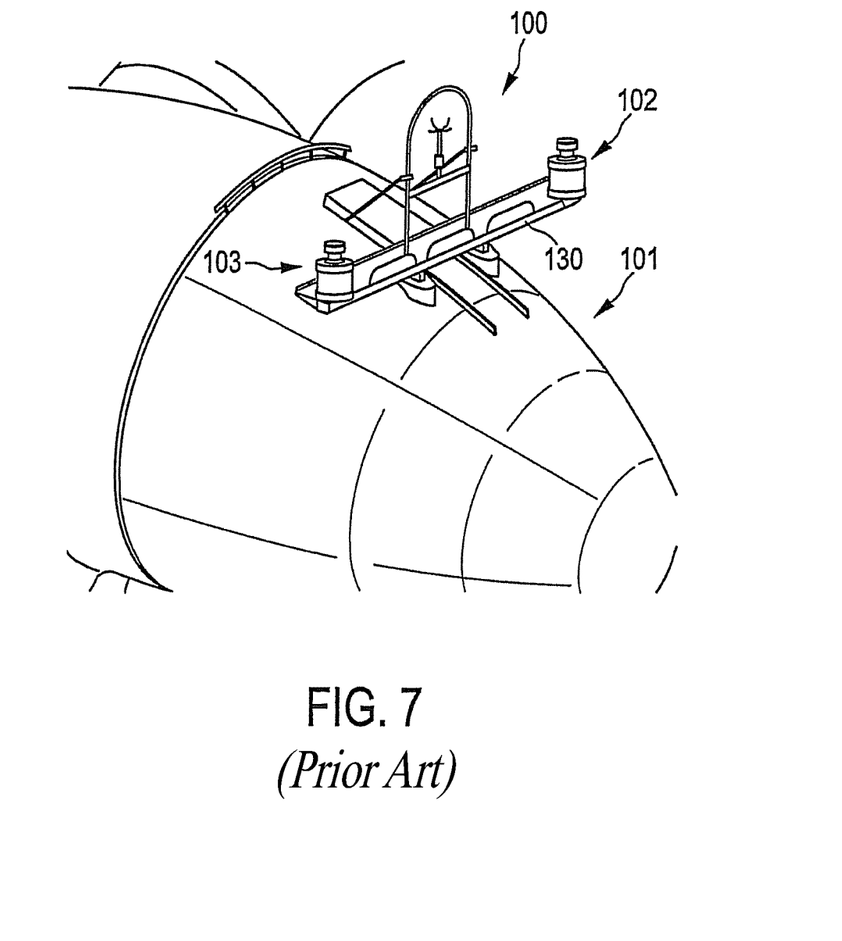
FIG. 7 shows an aviation obstruction lighting arrangement in accordance with the state of the art.

To combat that problem it is known to use two panoramic lights, instead of one panoramic light. Those panoramic lights which together substantially form the aviation obstruction lighting arrangement, are arranged on a transverse carrier frame structure which is basically arranged horizontally and transversely with respect to the horizontal rotor axis on the pod. The two panoramic lights are arranged at such a spacing from each other that a rotor blade can only cover one of the panoramic lights at a time. For example, FIG. 7 shows an aviation obstruction lighting arrangement 100 in accordance with the state of the art. Fixed on the pod 101 of which a portion is shown is a carrier frame structure 130 carrying a left-hand and a right-hand panoramic light device 102 and 103 which together substantially form the aviation obstruction lighting arrangement 100 in accordance with the state of the art.

Such a construction however is complicated and expensive, especially as additional weight has to be arranged on the pod due to the carrier frame structure and such carrier frame structures can also be susceptible to the wind, if they are not sufficiently stably produced and fixed in position. Added to that is the fact that the two panoramic lights together light up a region of 360° in doubled relationship, and taken together therefore light up a region of 720°. Accordingly energy must also be provided for lighting up 720°. In particular the emergency power unit for the aviation obstruction lighting arrangement must have a corresponding capacity and must thus be of a corresponding structural size and weight.

BRIEF SUMMARY

Embodiments of the present invention may provide a solution which as far as possible reduces or even resolves the above-indicated problems, at least as far as possible one of the above-indicated problems.

According to embodiments of the invention, a pod of a wind power installation is provided comprising an aviation obstruction lighting arrangement, the aviation obstruction lighting arrangement including: a central light device which in the erected condition of the wind power installation is arranged on the pod on the top thereof, and two lateral light devices which in the erected condition of the wind power installation are arranged at two mutually opposite sides of the pod.

Embodiments of the invention are utilized on an erected wind power installation in which the pod is already properly arranged on the pylon. For the purposes of description it is assumed that this is a wind power installation having a horizontal rotor axis. According to embodiments of the invention in that condition the central light device is arranged visibly on the top of the pod. The two lateral light devices are arranged at two mutually opposite sides of the pod. The pod is then therefore at least partially arranged between the two light devices. In a view frontally on to the rotor, that is to say from the point of view of the wind flowing towards the rotor hub, when the pod is turned into the wind, one lateral light device is thus disposed substantially at the left on the pod while the other lateral light device is disposed at the right on the pod and the central light device is arranged on the pod on the top thereof and the central light device and the two lateral light devices thus form the corner points of a triangle, preferably an isosceles triangle.

In operation of the wind power installation, in that view, a rotor blade coming out of the 6 o'clock position would firstly cover the lateral light device arranged at the left, then clear it due to the ongoing rotary movement, and then cover the central light device. Further rotation of the rotor means that the central light device is then clear to see again, subsequently the right-hand lateral light device is concealed and finally then cleared again.

DETAILED DESCRIPTION

According to embodiments of the invention, a pod of a wind power installation is provided comprising an aviation obstruction lighting arrangement, the aviation obstruction lighting arrangement including: a central light device which in the erected condition of the wind power installation is arranged on the pod on the top thereof, and two lateral light devices which in the erected condition of the wind power installation are arranged at two mutually opposite sides of the pod.

Embodiments of the invention are utilized on an erected wind power installation in which the pod is already properly arranged on the pylon. For the purposes of description it is assumed that this is a wind power installation having a horizontal rotor axis. According to embodiments of the invention in that condition the central light device is arranged visibly on the top of the pod. The two lateral light devices are arranged at two mutually opposite sides of the pod. The pod is then therefore at least partially arranged between the two light devices. In a view frontally on to the rotor, that is to say from the point of view of the wind flowing towards the rotor hub, when the pod is turned into the wind, one lateral light device is thus disposed substantially at the left on the pod while the other lateral light device is disposed at the right on the pod and the central light device is arranged on the pod on the top thereof and the central light device and the two lateral light devices thus form the corner points of a triangle, preferably an isosceles triangle.

In an embodiment at least one of the central light device and the two lateral light devices is mounted to a pod housing. As already mentioned the pod accommodates the generator and various parts of the operating equipment of the wind power installation. That can include actuating and control devices for the generator such as including monitoring devices. When using a dc-excited synchronous generator—as is frequently encountered in modern wind power installations—the corresponding dc control arrangement can be provided in the pod. In addition at least one azimuth drive with the corresponding automatic actuating system is usually provided in the pod. Further monitoring units such as for example a temperature monitoring device can be provided in the pod. The pod has an outer casing to enclose those and further elements, which casing can be composed of a plurality of parts and correspondingly encloses an internal space. At least one of the three light devices in accordance with the described configuration is arranged on such an outer casing. That makes it possible to avoid a carrier frame structure which extends through the outer skin and which goes back on one of machine bearers arranged in the pod. The use of the central and two lateral light devices according to embodiments of the invention means that it is possible for them to be mounted on the pod housing in that way, even for less stable outer casings.

In a further embodiment there is proposed a pod which is distinguished in that at least one of the central light device and the two lateral light devices is accessible from a pod interior and/or can be drawn into the pod interior, in particular can be folded or rotated thereinto. At any event in the larger modern wind power installations the pod interior can be accessed by people from the inside and the internal space is accessed by service personnel for maintenance and repair purposes. In accordance with this described embodiment the service personnel can then reach at least one of the three light devices from the pod interior. In that respect the corresponding light device can be removed for example as a whole or as part thereof from the pod interior from its fixing, preferably from its fixing on the pod housing. In accordance with further examples the respective light device is only removable in part so that for example only one actuating device can be removed or lighting means can be individually removed. For example for installation purposes the light device can be pushed from the inside through an opening in the pod housing outwardly, in which case a fixing portion and in particular a fixing flange remains in the interior of the pod housing for fixing to the pod housing. Such a fixing method in the sense of a plug-in procedure means that a light device can be exchanged or removed for maintenance easily and quickly.

In a variant it is proposed that at least one light device can be drawn into and in particular folded or rotated into the pod interior. Thus there is provided a corresponding mechanism such as for example a hinge. By releasing a fixing, the light device in question can then be released and drawn into the pod or in the opposite case moved outwardly and in particular pivoted outwardly and then fixed. Such a capability of the light device being drawn in and in particular folded or rotated in is not only advantageous for maintenance purposes, but it easily permits the corresponding light device to be already fitted to the pod before the wind power installation is set up. The light device and in particular the two lateral light devices, in spite of being pre-fitted, can be drawn into the pod interior when transporting the pod to the position of installation of the wind power installation to avoid damage during transport.

In a particularly advantageous embodiment at least one of the central light devices and the two lateral light devices is at least partially surrounded by a transparent protective cover. Such a protective cover projects outwardly from the pod housing and preferably covers over an opening in the pod cover. The respective light device or the remainder of the respective light device can be moved outwardly through such a covered opening, and in particular can be pushed or pivoted in order then to be moved into the operative position under the protective cover. Each light device can perform its function behind the protective cover and in that way is easily accessible, in particular from the interior of the pod. In the case of a maintenance operation the light device can be removed from the protective cover from the inside through the corresponding opening in the pod housing and maintained or changed. Throughout the entire time the pod housing still remains closed relative to the exterior at that location by virtue of the protective cover. To prevent the respective light device from emitting light in some directions, a suitable absorbent or reflecting cover means can be provided in the protective cover.

A further configuration proposes a pod which is characterized in that in the state of being properly arranged and measured in a horizontal plane the central light device has a light sector of at least 180°, preferably 360°, and the two lateral light devices each have a light sector of at least 90°, wherein the sum of those three light sectors together is at least 540°. Accordingly the three light devices together should cover at least 540°. In particular 180° are to be easily covered when viewed from, for example, the central light device in a horizontal plane, facing away from the rotor. It will be noted however that 180° are also to be covered twice in a direction towards the rotor. That means that 180° is to be lit up twice in particular from the central light device towards the rotor—towards the rotor plane, that is to say the plane in which the at least one rotor blade and in particular the three rotor blades of the rotor move. In that region therefore light is to be emitted by at least two of the light devices in any direction of said 180°. If therefore one of the light devices is covered by a rotor blade in those 180° towards the rotor or the rotor blade plane, a light device which emits light in the same direction still remains without being covered by a rotor blade—at any event at the respective moment.

Preferably for that purpose the central light device is in the form of a panoramic light and thus has a light sector of 360°, that is to say a complete circle. The two lateral light devices in this preferred example each have a light sector of 90°. Those 90° face towards the rotor blade plane. Thus 90° are covered twice in the direction of the rotor blade plane by the central light device and one lateral light device and the other 90° are covered towards the rotor blade plane by the other lateral light device and the central light device. In that respect, a known panoramic light of an aviation obstacle lighting arrangement could be used for the central light device and the two lateral light devices could be correspondingly smaller.

In another example both the central light device and also each of the two lateral light devices can have a light sector of 180°. In that case the 180° of the central light device face towards the rotor blade plane whereas the 180° of each lateral light device face in respect of 90° to the rotor blade plane and in respect to the further 90° away from the rotor blade plane. Both lateral light devices would therefore in that case together light up precisely 360°. The double lighting effect in the direction towards the rotor blade plane would thus be achieved by the 180° of the central light device. That example would have the advantage that at any event in relation to the design configuration of the light means and correspondingly also in relation to the electric connection power and actuation, all three light devices, namely the central one and the two lateral ones, could be identical. It would be noted however that a distinction would arise in the manner of mounting them.

The pod in accordance with a further configuration is characterized in that the pod has a rotor having a rotor axis and at least one rotor blade, preferably three rotor blades, and the aviation obstruction lighting arrangement in the appropriately installed condition of the wind power installation is so arranged that the rotor blades leave free at least the view on to the central light device or one of the two lateral light devices, for an external viewer disposed at least at the height of the pod and at a spacing of at least one rotor blade length. Basically that configuration relates to a view on to the wind power installation from a perspective in frontal relationship on to the rotor from the front, that is to say on to the rotor hub. In particular the aviation obstruction lighting arrangement must be visible from that perspective and from perspectives thereabove. Visibility from the ground is not an important consideration, rather visibility from the ground is often also unwanted and can additionally be prevented, which however is not to be further discussed here. Visibility in spite of rotor blades require an adequate spacing of the light devices relative to each other so that at any event the optical spacing of the light devices is at least as great as the optical width of the rotor blades.

Basically the aviation obstruction lighting arrangement must also be visible to a viewer who is at a greater height than the pod itself. In the case of modern wind power installations however the rotor blade is often at its widest at the hub and the perspective from the same height as the pod—at a certain distance—is thus the most critical. If the aviation obstruction lighting arrangement is therefore visible from that perspective other relevant perspectives should be non-critical. In other wind power installations it may naturally be necessary to check the visibility of the aviation obstruction lighting arrangement, from another perspective.

Preferably the pod is characterized in that the lateral light devices, in the properly arranged condition and in relation to the rotor axis as the longitudinal direction, are arranged in a horizontal direction at a location of the widest portion of the pod or further in the direction towards the rotor, and/or in a vertical direction at a location of the widest portion of the pod or thereabove.

It is to be noted that nowadays many modern wind power installations no longer have substantially box-shaped pods but for example are of a bulgy or similar configuration. With such pod shapes, the lateral light devices are arranged substantially at the widest location of the pod—with respect to a wind power installation in the finished erected condition. That applies both in the horizontal and also in the vertical direction, wherein for the widest location, the term 'width' relates to the rotor longitudinal axis, that is to say a dimension transversely relative to the longitudinal axis of the rotor. In that respect the lateral light devices can be arranged preferably even higher in the vertical direction and in a horizontal direction preferably even further towards the rotor.

At least the spacing of the lateral light devices relative to each other however is such that it is greater than the greatest blade depth or blade width. That ensures that a rotor blade cannot in any case simultaneously cover both lateral light devices.

In that respect it is also to be observed that, in the case of an arrangement above the widest location, the adjacent sides at which the two lateral light devices are disposed do not have to extend in mutually parallel relationship. The same also applies for an arrangement which is not precisely at the widest location in the horizontal direction. With the described arrangements care is to be taken to ensure in particular that the pod does not mask the light device in an unwanted partial region. Possibly coverage by the pod can be prevented by the respective light device projecting correspondingly far from the pod surface.

In a further embodiment there is proposed a pod in which the lateral light devices are arranged in a vertical direction approximately at the center of the pod or thereabove and/or are arranged in a horizontal direction approximately at the center or further in the direction towards the rotor. Such a configuration is to be preferred in particular when the pod does not have a region or a very large region which is to be interpreted as the widest location. In that case both in the horizontal direction and also in the vertical direction, the central position can be selected at the respective side of the pod and the light devices are arranged there or thereabove and/or further in the direction towards the rotor. In this case also the lateral arrangement relates to the rotor axis as the longitudinal direction.

Preferably the pod is provided with an aviation obstruction lighting arrangement which is adapted to emit white light in the day and red light at night. For that purpose the aviation obstruction lighting arrangement can therefore have the respective light devices, different regions and/or different light means, in particular white and red light emitting diodes.

According to an embodiment of the invention there is also proposed a wind power installation having a pod as described herein. There is also proposed in accordance with an embodiment of the invention an aviation obstruction lighting arrangement which has a central light device and two lateral light devices and which is provided for use in a pod as described herein. The aviation obstruction lighting arrangement and in particular the light devices therefore satisfy the features provided at least in connection with one of the above-described embodiments. In particular the division of the aviation obstruction lighting arrangement into a central light device which is to be fastened on a pod and two lateral light devices which are to be fastened to pod sides is to be distinguished from the state of the art. In addition a characteristic of a preferred embodiment of an aviation obstruction lighting arrangement is that the three light devices are together adapted to at any event substantially emit light over a light sector of 540°. Thus that can also include the preferred use of a power supply adapted to those 540°.

It will be appreciated that the central light device and also the lateral light devices can in turn be subdivided into further sub-elements. For that purpose on the one hand it is possible to consider a subdivision such that the red and white light means are separate in accordance with a preferred embodiment. It is equally possible to consider a further subdivision of the sectors to be illuminated by separate individual elements.

In particular the reduction which is made possible in the total light sector over which light is to be emitted, to 540°, enjoys some advantages. That makes it possible to save weight, more specifically both for the light devices and also for the power supply, and in particular a corresponding emergency power arrangement. Alternatively or in combination an emergency power arrangement of known size can provide a supply over a longer period for the aviation obstruction lighting arrangement according to embodiments of the invention. That also involves a possible reduction in structural size for the aviation obstruction lighting arrangement, in particular a corresponding emergency power arrangement.

An embodiment of the present invention is described in greater detail by way of example hereinafter with reference to the accompanying Figures.

Figure 1:
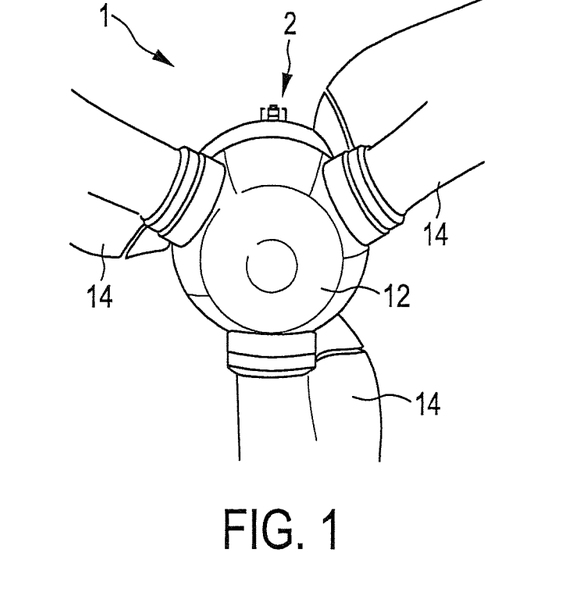
FIG. 1 shows a pod according to an embodiment of the invention as a front view on to the rotor hub.

FIG. 1 shows a pod 1 as a front view on to a hub cover 12 with three rotor blades 14 which however are shown only in respect of their root region. Of the rotor blades 14 one is in a so-called 6 o'clock position and in that case masks the pylon on which the pod 1 is arranged. Two further rotor blades 14 are in their 10 o'clock and 2 o'clock positions respectively and thus allow a free view on to a central light device 2 arranged on the top of the pod 1. The central light device 2 is in the form of a panoramic light. A left-hand and a right-hand lateral light device are concealed in FIG. 1 by the rotor blades 14 in the 10 o'clock and 2 o'clock positions respectively.

Figure 2:
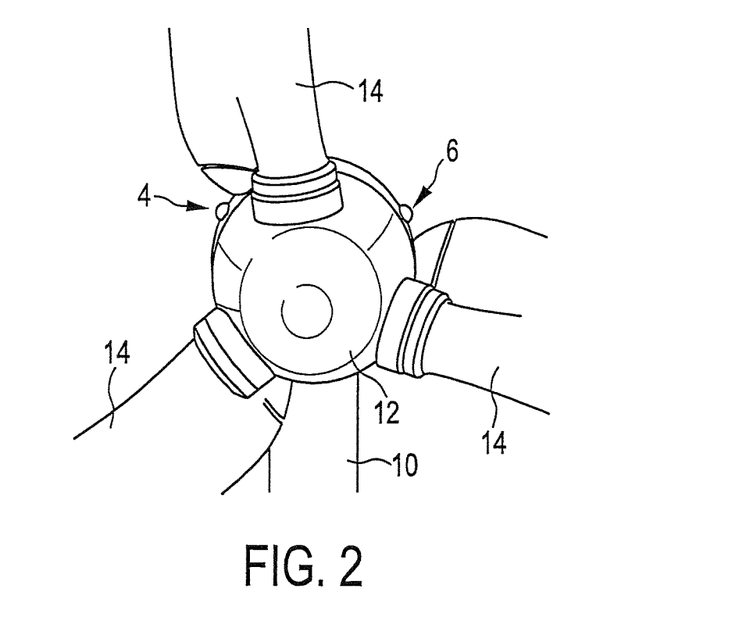
FIG. 2 shows the pod as a front view as shown in FIG. 1 but with the rotor in an altered position.

Referring to FIG. 2 the rotor with the rotor blades 14 has rotated further with respect to FIG. 1 and a rotor blade 14 is now almost in a 12 o'clock position. That upwardly pointing rotor blade 14 now conceals the central light device 2. In return, there is a free view on to the left-hand lateral light device 4 and the right-hand lateral light device 6. In other respects there is also a free view of the pylon 10 which is only indicated here.

Figure 3:
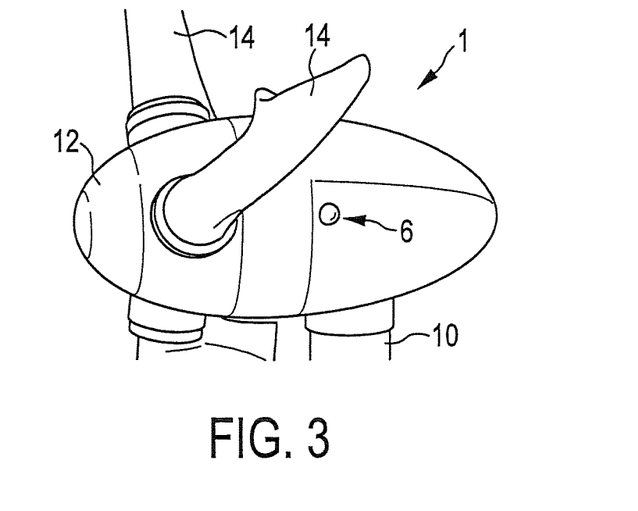
FIG. 3 shows a side view of the pod of FIGS. 1 and 2.

The position of the right-hand lateral light device 6 will be apparent from the side view of the pod 1 in FIG. 3. The right-hand lateral light device 6 is arranged in the longitudinal direction of the pod 1, that is to say in FIG. 3 in the direction from right to left approximately at the center of the pod 1. That is also approximately the widest location of the pod 1. In a vertical direction the right-hand light device 6 is somewhat higher than the center of the pod 1. In this FIG. 3 the central light device arranged on the top of the pod is concealed by the rotor blade 14 facing towards the viewer, but the lateral light device 6 is visible.

Figure 4:
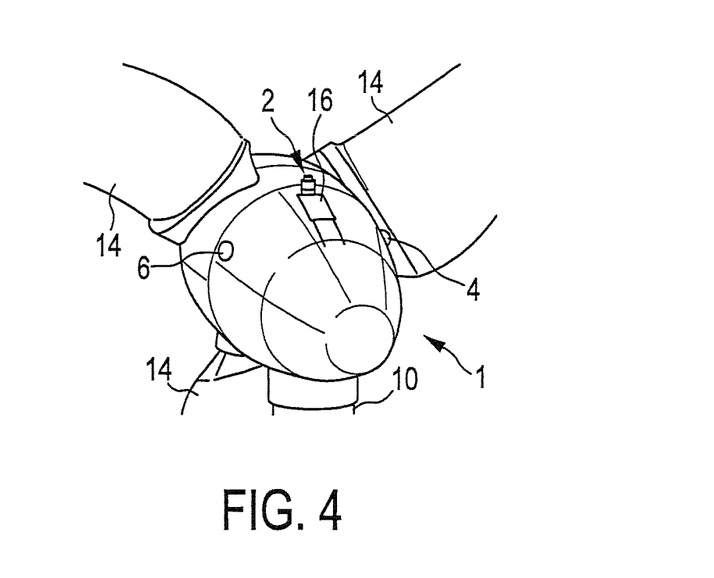
FIG. 4 shows a rear perspective view of the pod of FIGS. 1 and 2.

All three light devices 2, 4, 6 can be seen from the rear perspective view in FIG. 4. The central light device 2 is arranged on the top of the pod 1. The right-hand and left-hand lateral light devices 6, 4—which are to be seen at the left and the right because of the view from the rear in FIG. 4—are disposed approximately at opposite sides. The pod 1 is thus arranged approximately between the right-hand and left-hand lateral light devices 6, 4. In other respects the three light devices 2, 4, 6 are arranged approximately on an annular region around the pod 1, that annular region being disposed in a plane parallel to the rotor blade plane. It is also possible to see from FIG. 4 an exit hatch 16 immediately behind the central light device 2.

Figure 5:
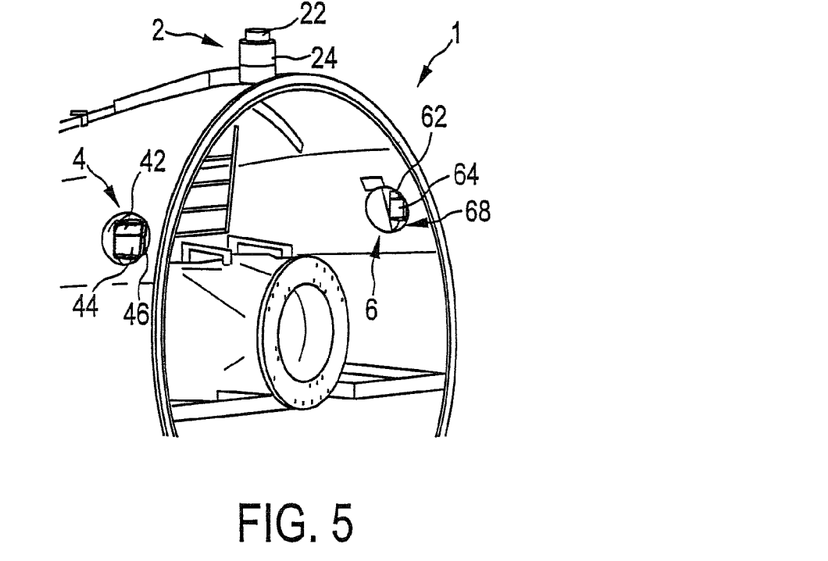
FIG. 5 shows a portion of a pod according to an embodiment of the invention inclinedly from the front without a generator and pod cover.

The position and nature of the arrangement and the specific configuration of the three light devices 2, 4, 6 which together substantially form an aviation obstruction lighting arrangement can be seen from the view of the open pod 1 in FIG. 5. The central light device 2 is arranged on the top of the pod 1 and in its upper region has a red region 22 and therebelow a white region 24 for emitting red and white light respectively. The left-hand light device 4 can be seen in FIG. 5, through a substantially transparent cover 46. In this case the transparent cover 46 is arranged on the pod 1 and projects, similarly to a frog's eye. The left-hand lateral light device 4 also has an upper red region 42 and a lower white region 44 for emitting red and white light respectively. In this case the left-hand lateral light device 4 is so arranged in the transparent cover 46 that the left-hand lateral light device 4 itself projects beyond the pod 1 so that the pod 1 does not conceal the left-hand lateral light device 4 in an unwanted fashion.

The right-hand lateral light device 6 is accessible and can be seen from a pod interior, as shown in FIG. 5. The right-hand lateral light device 6, similarly to the left-hand lateral light device 4, is arranged in a transparent cover 66 which projects outwardly with respect to the pod 1. The right-hand lateral light device 6 also has an upper red region 62 and a lower white region 64. In this case the right-hand lateral light device 6 is accessible through an opening 68 in the pod 1.

Figure 6:
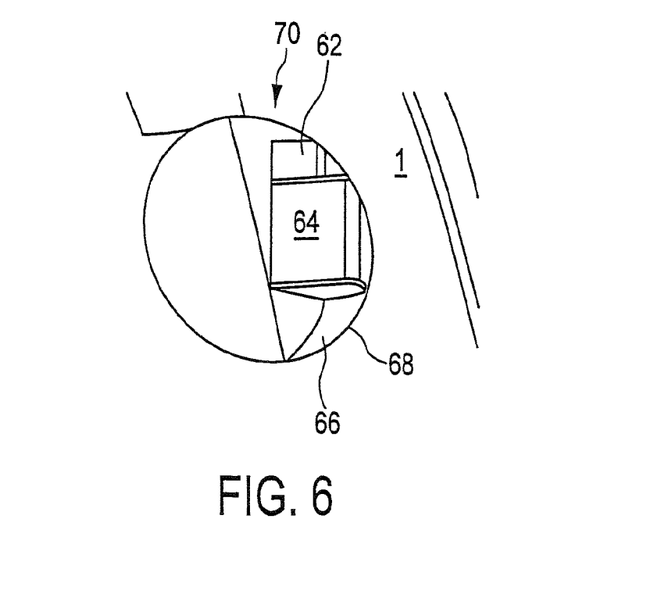
FIG. 6 shows a detail portion of FIG. 5 showing an opening in the pod housing with a lateral light device.

The right-hand lateral light device 6 of FIG. 5 is shown on an enlarged scale in FIG. 6. Shown there is the opening 68 internally in the pod 1, through which there is access from the interior of the pod 1 to the right-hand lateral light device. The right-hand lateral light device 6 shows the upper red region 62 and the lower white region 64. It is to be noted that the right-hand lateral light device 6 basically corresponds in every respect to the left-hand lateral light device 4, the two being of a configuration in mirror-image relationship with each other. In order precisely to prevent a bright glare into the interior of the pod 1 through one of the lateral light devices 4, 6 during the day the opening 68 in respect of the right-hand lateral light device or a corresponding opening in respect of the left-hand lateral light device 4 can be air-tightly closed, which however is not taken into consideration in the Figures.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pod of a wind power installation comprising:
an aviation obstruction lighting arrangement, the aviation obstruction lighting arrangement including:

a central light device which in the erected condition of the wind power installation is arranged on the pod on a top thereof, and two lateral light devices which in the erected condition of the wind power installation are arranged at mutually opposite sides of the pod, wherein in a properly arranged condition and measured in a horizontal plane, the central light device has a light sector of at least 180° and the two lateral light devices each have a light sector of at least 90°, and wherein the sum of the light sectors of the central light device and the two lateral light devices is together at least 540°.

2. The pod of claim 1 wherein at least one of the central light device and the two lateral light devices is mounted to a housing of the pod.

3. The pod of claim 1 wherein at least one of the central light device and the two lateral light devices is accessible from an interior of the pod.

4. The pod of claim 1 wherein at least one of the central light device and the two lateral light devices is at least partially enclosed by a transparent protective cover.

5. The pod of claim 1 wherein the pod has a rotor having a rotor axis and a plurality of rotor blades, and wherein the aviation obstruction lighting arrangement in a properly installed condition of the wind power installation is so arranged that the rotor blades leave unobstructed at least a view on to the central light device or one of the lateral light devices for an external viewer who is disposed at a height greater than or equal to a height of the pod and at a spacing relative to the pod of greater than or equal to one rotor blade length.

6. The pod of claim 1 wherein the lateral light devices in a properly arranged condition and with respect to a rotor axis as the longitudinal direction are arranged in a horizontal direction at a location corresponding to a widest portion of the pod or further in a direction towards the rotor.

7. The pod of claim 1 wherein the lateral light devices are arranged in a vertical direction approximately at a center of the pod or thereabove.

8. The pod of claim 1 wherein the aviation obstruction lighting arrangement is adapted to emit white light by day and red light at night.

9. The pod of claim 1 wherein at least one of the central light device and the two lateral light devices is configured to be folded into an interior of the pod.

10. The pod of claim 1 wherein the lateral light devices in a properly arranged condition and with respect to a rotor axis as the longitudinal direction are arranged in a vertical direction at a location corresponding to a widest portion of the pod or thereabove.

11. The pod of claim 1 wherein the lateral light devices are arranged in a horizontal direction approximately at a center of the pod or further in a direction towards the rotor.

12. A pod of a wind power installation comprising:
an aviation obstruction lighting arrangement, the aviation obstruction lighting arrangement including:
a central light device which in the erected condition of the wind power installation is arranged on the pod on a top thereof, and
two lateral light devices which in the erected condition of the wind power installation are arranged at mutually opposite sides of the pod,
wherein at least one of the central light device and the two lateral light devices is configured to be folded into an interior of the pod.

13. The pod of claim 12 wherein at least one of the central light device and the two lateral light devices is mounted to a housing of the pod.

14. The pod of claim 12 wherein the lateral light devices are arranged in a vertical direction approximately at a center of the pod.

15. A pod of a wind power installation comprising:
a rotor having a rotor axis;
a plurality of baldes;
an aviation obstruction lighting arrangement, the aviation obstruction lighting arrangement including:
a central light device which in the erected condition of the wind power installation is arranged on the pod on a top thereof, and
two lateral light devices which in the erected condition of the wind power installation are arranged at mutually opposite sides of the pod,
wherein the aviation obstruction lighting is so arranged that the rotor blades leave unobstructed at least a view on to the central light device or one of the lateral light devices for an external viewer who is disposed at a height greater than or equal to a height of the pod and at a spacing relative to the pod of greater than or equal to one rotor blade length.

16. The pod of claim 15 wherein at least one of the central light device and the two lateral light devices is at least partially enclosed by a transparent protective cover.

17. A wind power installation comprising the pod according to claim 1.

* * * * *

UNITED STATES PATENT AND TRADEMARK OFFICE
CERTIFICATE OF CORRECTION

PATENT NO. : 8,636,388 B2  Page 1 of 1
APPLICATION NO. : 13/055451
DATED : January 28, 2014
INVENTOR(S) : Jochen Röer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this
Twenty-second Day of September, 2015

Michelle K. Lee
*Director of the United States Patent and Trademark Office*